(12) United States Patent
Kawaguchi et al.

(10) Patent No.: US 8,299,965 B2
(45) Date of Patent: Oct. 30, 2012

(54) POSITIONING SYSTEM, POSITION INFORMATION TRANSMITTER, COMMUNICATION TERMINAL, AND CONTROL METHOD OF THE POSITIONING SYSTEM

(75) Inventors: Takamasa Kawaguchi, Yokohama (JP); Tomoichi Ebata, Machida (JP); Yutaka Shimogaki, Hachiouji (JP); Hitoshi Ogasawara, Kawasaki (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 13/205,704

(22) Filed: Aug. 9, 2011

(65) Prior Publication Data

US 2011/0291883 A1    Dec. 1, 2011

Related U.S. Application Data

(63) Continuation of application No. 12/379,714, filed on Feb. 27, 2009, now Pat. No. 7,994,970.

(30) Foreign Application Priority Data

Apr. 10, 2008  (JP) ................................. 2008-102715

(51) Int. Cl.
 *G01S 1/00* (2006.01)
(52) U.S. Cl. ........................................................ 342/386
(58) Field of Classification Search ................... 342/386
 See application file for complete search history.

(56) References Cited

U.S. PATENT DOCUMENTS

| 6,618,671 | B2 | 9/2003 | Dooley et al. | |
| 7,251,562 | B1* | 7/2007 | Brodie et al. | 701/469 |
| 7,400,294 | B2* | 7/2008 | Whitehead et al. | 342/357.24 |
| 7,948,437 | B2* | 5/2011 | Torimoto et al. | 342/386 |

FOREIGN PATENT DOCUMENTS

| JP | 06-027214 | 2/1994 |
| JP | 2004-132750 | 4/2004 |
| JP | 2005-195347 | 7/2005 |
| JP | 2006-502412 | 1/2006 |
| JP | 2007-221768 | 8/2007 |
| JP | 2007-278756 | 10/2007 |
| JP | 2008-241284 | 10/2008 |

OTHER PUBLICATIONS

Japan Aerospace Exploration Agency, "Quasi-Zenith Satellite System User Interface Specifications (IS-QZSS)", Nov. 30, 2007.
Jaxa, QZSS project Industrial Collaboration Department, "Exchange opinions about collected comments and improvement", $3^{rd}$ QZSS User Meeting, Mar. 10, 2008.

* cited by examiner

*Primary Examiner* — Harry Liu
(74) *Attorney, Agent, or Firm* — Antonelli, Terry, Stout & Kraus, LLP.

(57) ABSTRACT

A position information transmitter including: a digital processing device including a CPU and a position information database storing position information of the position information transmitter and information of channels used by other position information transmitters; and a radio transmitting device executing a signal modulation, wherein the digital processing device generates spread spectrum signals from the position information of the position information transmitter and information of channels used by other position information transmitters, by using the C/A code, and the radio transmitting device modulates the spread spectrum signals and transmits modulated signals as a radio signals.

8 Claims, 13 Drawing Sheets

POSITION INFORMATION DATA BASE 1122

| | |
|---|---|
| BOUNDARY FLAG | 1 |
| SET HEIGHT | 30m ABOVE SEA-LEVEL |
| SET POSITION (LATITUDE) | LATITUDE 35.1234 NORTH |
| SET POSITION (LONGITUDE) | LONGITUDE 139.3456 EAST |
| SENSOR INFORMATION | ATMOSPHERIC PRESSURE 1030 hPa, BRIGHTNESS 100 LUX |
| CHANNEL OF OWN DEVICE | 197 |
| CHANNELS OF SURROUNDING DEVICES | 188,191,192,194,195,196,199 |

| INDOOR/OUTDOOR | CORRELATING UNIT 221 | | | | |
|---|---|---|---|---|---|
| | CORRELATOR 1 | CORRELATOR 2 | CORRELATOR 3 | CORRELATOR 4 | CORRELATOR 5 |
| | SATELLITE 8CH | SATELLITE 11CH | SATELLITE 15CH | SATELLITE 20CH | IMES 180CH |
| INDOOR | SATELLITE 8CH | IMES 174CH | IMES 175CH | IMES 179CH | IMES 180CH |

| | CORRELATING UNIT | | | | |
|---|---|---|---|---|---|
| | CORRELATOR 1 | CORRELATOR 2 | CORRELATOR 3 | CORRELATOR 4 | CORRELATOR 5 |
| OUTDOOR | SATELLITE 8CH | SATELLITE 11 CH | SATELLITE 15 CH | SATELLITE 20 CH | IMES 180 CH |
| INDOOR/OUTDOOR | SATELLITE 8CH | SATELLITE 11 CH | IMES 175 CH | IMES 179 CH | IMES 180 CH |
| INDOOR | SATELLITE 8CH | IMES 174 CH | IMES 175 CH | IMES 179 CH | IMES 180 CH |

POSITIONING SYSTEM, POSITION INFORMATION TRANSMITTER, COMMUNICATION TERMINAL, AND CONTROL METHOD OF THE POSITIONING SYSTEM

CROSS REFERENCE TO RELATED APPLICATION

This is a continuation of U.S. application Ser. No. 12/379,714, filed Feb. 27, 2009 now U.S. Pat. No. 7,994,970. This application relates to and claims priority from Japanese Patent Application No. 2008-102715, filed on Apr. 10, 2008. The entirety of the contents and subject matter of all of the above is incorporated herein by reference.

BACKGROUND OF THE INVENTION

1. Field of the Invention

The present invention relates to a positioning system, a position information transmitter, a communication terminal, and a control method of the positioning system and, particularly, to a technology that enables stable and reliable acquisition of the current position of the communication terminal.

2. Background Art

A system utilizing radio signals transmitted from artificial satellites such as GPS satellites (hereinafter, satellite positioning signals) has a problem that the positioning accuracy deteriorates or positioning becomes impossible when a communication terminal such as a GPS receiver enters an area where the satellite positioning signals may not be received such as an indoor area, a street with buildings, or an underground mall.

Therefore, for example, Japanese Patent Application Laid-Open Publication No. 2007-278756 discloses a technology of providing an apparatus transmitting a position information signal, which is a signal indicative of a position, to an area where the satellite positioning signals may not be received such as an indoor area or an underground mall to allow the communication terminal to receive the position information signal and acquire the current position.

To enable stable and reliable acquisition of the current position of a communication terminal by a communication terminal capable of positioning with the satellite positioning signal and positioning with the position information signal as in the above technology, an arrangement is required to appropriately determine which of the satellite positioning signal or the position information signal should be received to set the operation state of the communication terminal.

SUMMARY OF THE INVENTION

The present invention was conceived in view of the above background and it is therefore the object of the present invention to provide a positioning system, a position information transmitter, a communication terminal, and a control method of the positioning system capable of stable and reliable acquisition of the current position of the communication terminal.

In order to achieve the above object, according to a major aspect of the present invention there is provided a positioning system comprising a position information transmitter including a transmitting part that transmits a position information signal as a signal compatible with a satellite positioning signal that is a radio signal for positioning transmitted from an artificial satellite, the position information signal being a radio signal containing position information that is information indicative of a position; and a communication terminal including a positioning processing part that when receiving the satellite positioning signal, finds a current position of the communication terminal by finding a position of the artificial satellite from the satellite positioning signal, the positioning processing part upon receipt of the position information signal finding a current position of the communication terminal based on the position information contained in the position information signal, and a plurality of correlators each capable of independently receiving the radio signals, the transmitting part transmitting the position information signal containing operation mode determination information that is information for use in determining which of the satellite positioning signal or the position information signal each of the correlators is to receive, the communication terminal including an operation mode setting part that sets which of the satellite positioning signal or the position information signal each of correlators is to receive based on the operation mode determination information contained in the received position information signal.

According to the present invention, the current position of a communication terminal may stably and reliably be acquired.

BRIEF DESCRIPTION OF THE DRAWINGS

FIG. 3 depicts an example of a position information database 1122;

FIG. 7 is an exemplary setting of the correlators in the operation modes;

FIG. 12 depicts an exemplary setting of the correlators in the operation modes.

DESCRIPTION OF THE EMBODIMENTS

Figure 1:
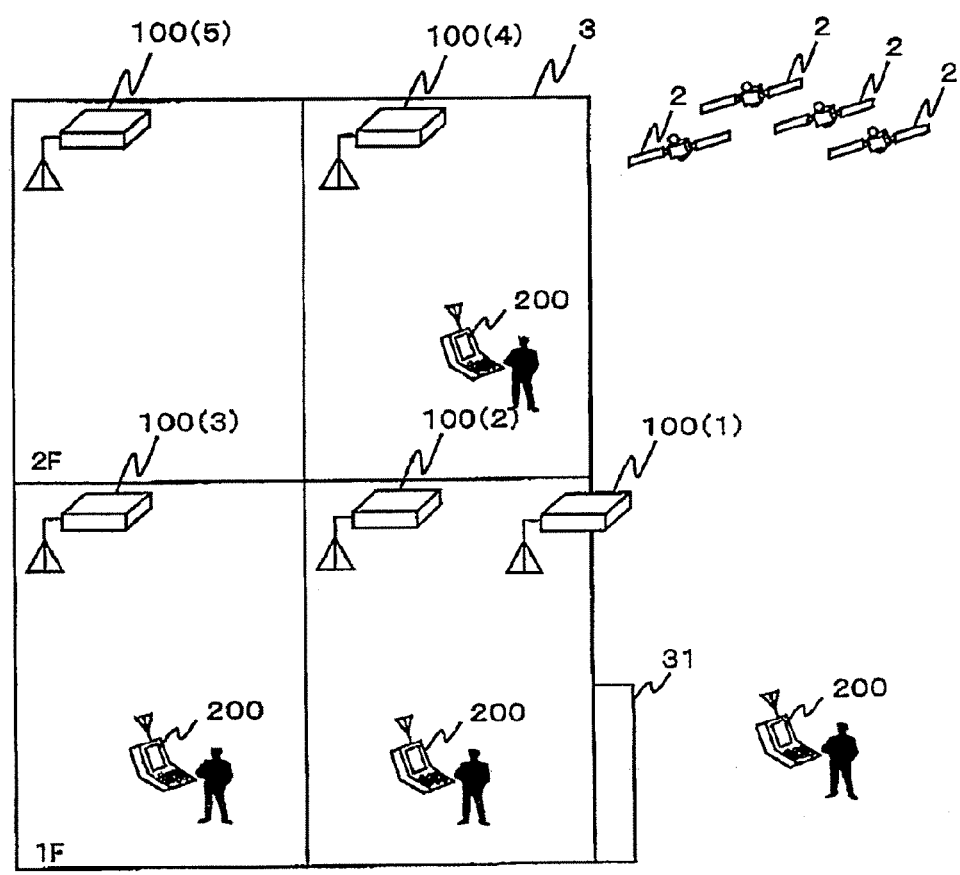
FIG. 1 is a diagram of a schematic configuration of a positioning system 1.

An embodiment of the present invention will now be described with reference to the drawings. FIG. 1 depicts a schematic configuration of a positioning system 1 described as the embodiment of the present invention. As shown in FIG. 1, the positioning system 1 includes a plurality of artificial satellites 2 transmitting radio signals for positioning (hereinafter, satellite positioning signals), a plurality of position information transmitters 100 transmitting radio signals including information indicative of positions (hereinafter, position information signals), and communication terminals 200 having a function of acquiring the own current position based on the radio signals from the artificial satellites 2 or the position information transmitters 100.

The artificial satellites 2 are, for example, artificial satellites in positioning systems such as GPS (Global Positioning System), Galileo positioning system, GLONASS (Global Navigation Satellite System), and Quasi-Zenith Satellites. It is assumed that the artificial satellites 2 are GPS satellites and that the satellite positioning signals, i.e., GPS signals transmitted from the artificial satellites 2 are L1 signals (1575.42 MHz) or L2 Signals (1227.6 MHz) in the following description.

The satellite positioning signals sent from the artificial satellites 2 include so-called navigation messages. A navigation message includes a total of 25 frames, for example, and each frame includes five sub-frames and a sub-frame is made up of 300 bits. Each sub-frame includes correction information of satellite clock, precise orbit information (ephemeris), general orbit information (almanac), ionosphere correction information, UTC correction information, and health information of artificial satellites, for example.

The satellite positioning signals sent from the artificial satellites 2 are subjected to BPSK (Bi Phase Shift Keying) modulation with a C/A code (Coarse/Acquisition code) that is a pseudorandom code (PRN number (Pseudo Random Noise Code)) uniquely added to each of the artificial satellites 2.

The position information signals transmitted from the position information transmitters 100 are compatible with the satellite positioning signals transmitted from the artificial satellites 2 and are transmitted as radio signals having the modulation mode and the frame configuration same as the satellite positioning signals. Each of the position information transmitters 100 is given a C/A code and the position information signals are subjected to the BPSK modulation with a C/A code of the transmitting position information transmitters 100.

Figure 2:
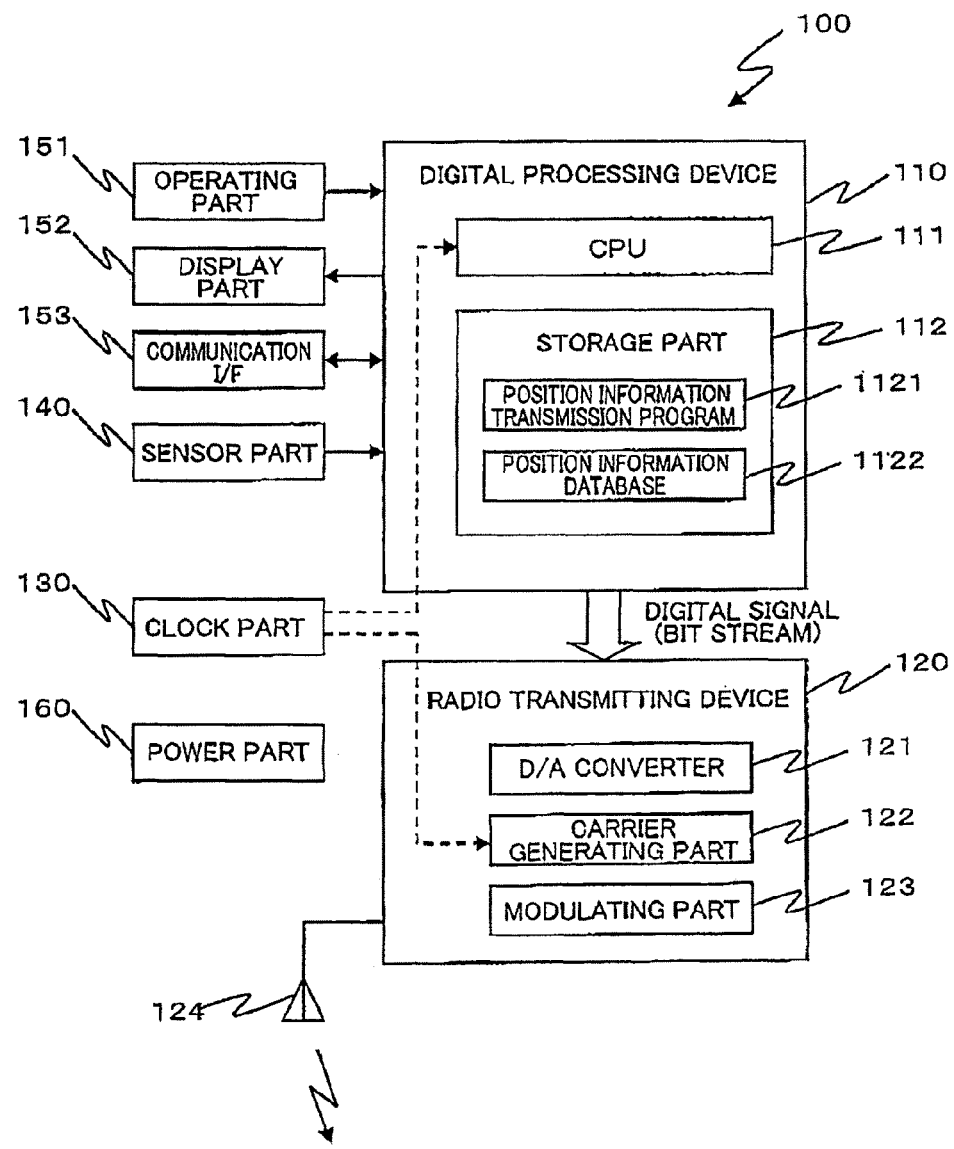
FIG. 2 is a block diagram of a position information transmitter 100.

FIG. 2 is a block diagram of the position information transmitter 100. As shown in FIG. 2, the position information transmitter 100 includes a digital processing part 110, a radio transmitting part 120, a clock part 130, a sensor part 140, an operating part 151, a displaying part 152, a communication I/F 153, and a power source part 160.

The digital processing part 110 includes a CPU 111 and a storage part 112 (e.g., a storage device, for example, RAM (Random Access Memory), ROM (Read Only Memory), and a non-volatile memory such as flash memory).

The CPU 111 executes programs stored in the storage part 112 to implement various functions provided by the position information transmitter 100. The storage part 112 stores a position information transmission program 1121 that is a program implementing a function about transmission of the position information signals (hereinafter, a position information transmitting part) and a position information database 1122 that has registered data indicative of the position (latitude, longitude, altitude, etc.) where the position information transmitter 100 is disposed.

The position information transmitting part implemented by the position information transmission program 1121 generates digital signals (bit stream) through the spread spectrum with the own PRN number (C/A code) from data, such as navigation messages, to be included in the position information signals transmitted from the position information transmitter 100 and inputs the generated digital signals to the radio transmitting part 120.

The radio transmitting part 120 includes a D/A converter 121, a carrier generating part 122, a modulating part 123, and an antenna 124.

The D/A converter 121 converts the digital signals input from the digital processing part 110 into analog signals.

The carrier generating part 122 generates a carrier wave of the position information signal based on the clock signal input to the clock part 130.

The modulating part 123 modulates (BPSK-modulates) the analog signal input from the D/A converter 121 with the carrier wave (1575.42 MHz when the position information signal is the L1 signal) input from the carrier generating part 122 and inputs the modulated signal to the antenna 124.

The clock part 130 generates a clock signal for operating the CPU 111 and a clock signal (e.g., 1.023 MHz) for generating the carrier wave. The clock part 130 includes an oscillator such as TCXO (temperature compensated crystal oscillator) and OCXO (oven-controlled crystal oscillator), for example.

The operating part 151 is a user interface for performing input operation to the position information transmitter 100 and includes operation buttons and switches, for example.

The displaying part 152 is an interface that displays various pieces of information when performing input operation to the position information transmitter 100 and when checking the operation state of the position information transmitter 100. The displaying part 152 is a liquid crystal monitor or LED (Light Emitting Diode), for example.

The communication I/F 153 is a communication interface for connecting the position information transmitter 100 to an external apparatus such as a computer (information processing apparatus). The communication I/F 153 is RS-232C, UART (Universal Asynchronous Receiver Transmitter), open collector, TTL (Transistor-Transistor Logic), parallel I/F, and USB (Universal Serial Bus), for example. When registering data to or maintaining the position information database 1122, a computer is connected to the position information transmitter 100 through the communication I/F 153.

The sensor part 140 includes sensors acquiring information (disposition position environment information) indicative of the current surrounding environment such as an atmospheric pressure sensor and an illuminance sensor. As described later, the information output from the sensor part 140 is used for selecting the position information signal if the communication terminal 200 receives a plurality of position information signals or for correction when acquiring the current position of its own.

The power source part 160 supplies drive power to the parts of the position information transmitter 100.

FIG. 3 shows an example of the position information database 1122. The position information database 1122 includes registrations of a boundary flag 311, a height 312, a disposition position of the position information transmitter 100 (latitude 313, longitude 314), sensor information 315, an own device channel 316, surrounding device channels 317, etc. The information registered in the position information database 1122 will hereinafter be referred to as position information.

The information registered in the position information database 1122 includes the boundary flag 311, which is set to "1: on" or "0: off". The boundary flag 311 is information (operation mode setting information) used for setting which of the satellite positioning signal or the position information signal is received by each of its correlators. A value of the boundary flag 311 is set to "1: on" in the position information transmitter 100(1) disposed near a doorway 31 of a building 3 of FIG. 3 and the boundary flags 311 are set to "0: off" in the position information transmitters 100(2) to 100(5) within the building 3, for example.

The sensor information 315 is set as real-time detection values detected by various sensors.

The own device channel 316 is set as information indicative of a transmission channel (corresponding to the C/A code of the own device) of the position information signal transmitted by the position information transmitter 100.

The surrounding device channels 317 are set as information indicative of transmission channels (corresponding to the C/A codes of other devices) of the position information signals of other position information transmitters 100 disposed around the position information transmitter 100.

Figure 4:
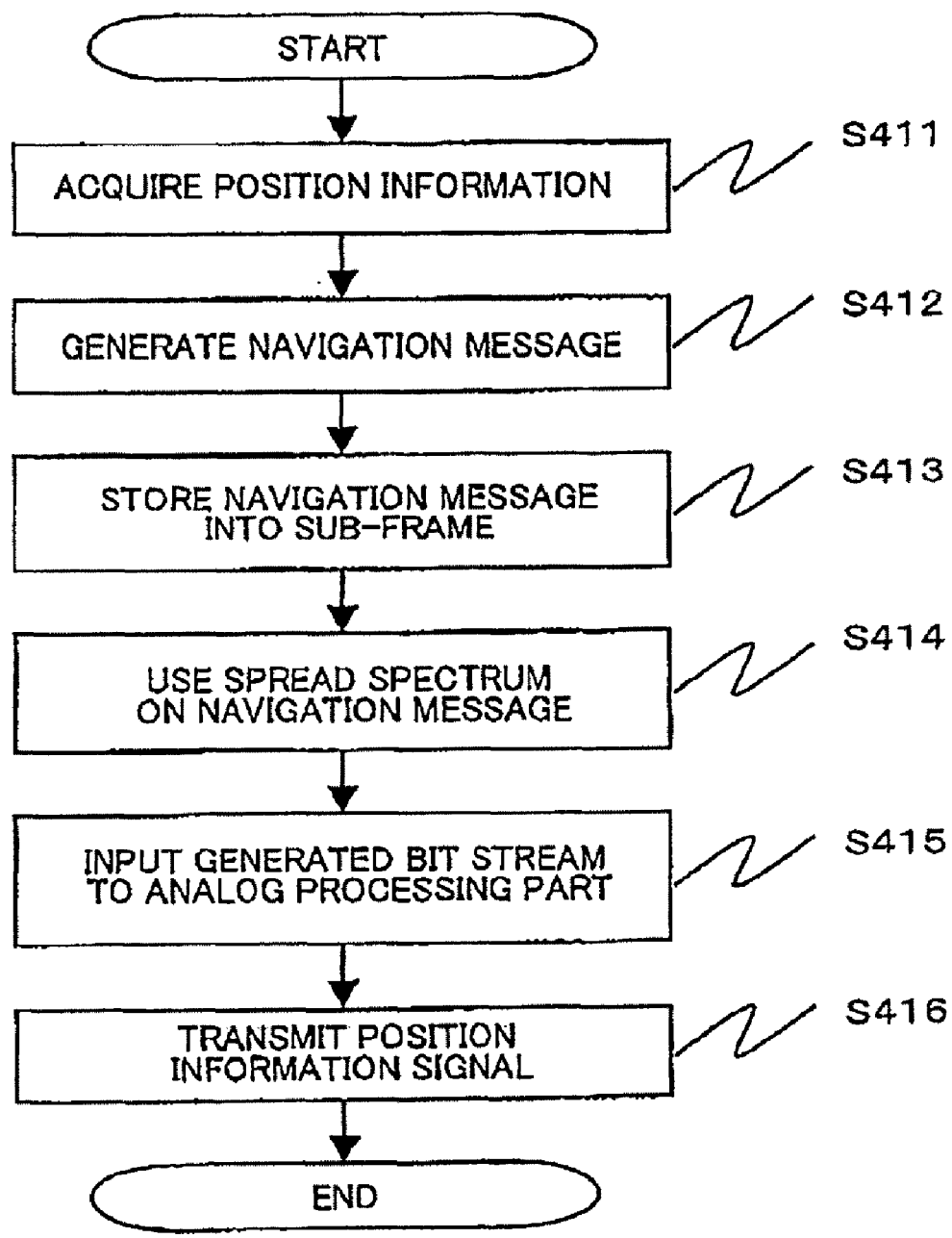
FIG. 4 is an explanatory flowchart of a transmission process of the position information signal executed by the position information transmitter 100.

FIG. 4 is an explanatory flowchart of a transmission process of the position information signal executed by the position information transmitter 100. A letter "S" added to the beginning of reference numerals stands for step.

When transmitting the position information signal, the digital processing part 110 of the position information transmitter 100 acquires position information to be included in the position information signal from the position information database 1122 (S411). The digital processing part 110 generates a navigation message including the acquired position information (S412) and stores the generated navigation message into a sub-frame (S413).

The digital processing part 110 generates digital signals (bit stream) through the spread spectrum with the own C/A code from the navigation message stored in the sub-frame (S414) and inputs the generated digital signals to the radio transmitting part 120 (S415). The radio transmitting part 120 modulates the carrier wave depending on the input digital signal to transmit the position information signal from the antenna 124 (S416). The position information transmitter 100 repeatedly transmits the position information signal generated as above at predetermined timings.

Figure 5:
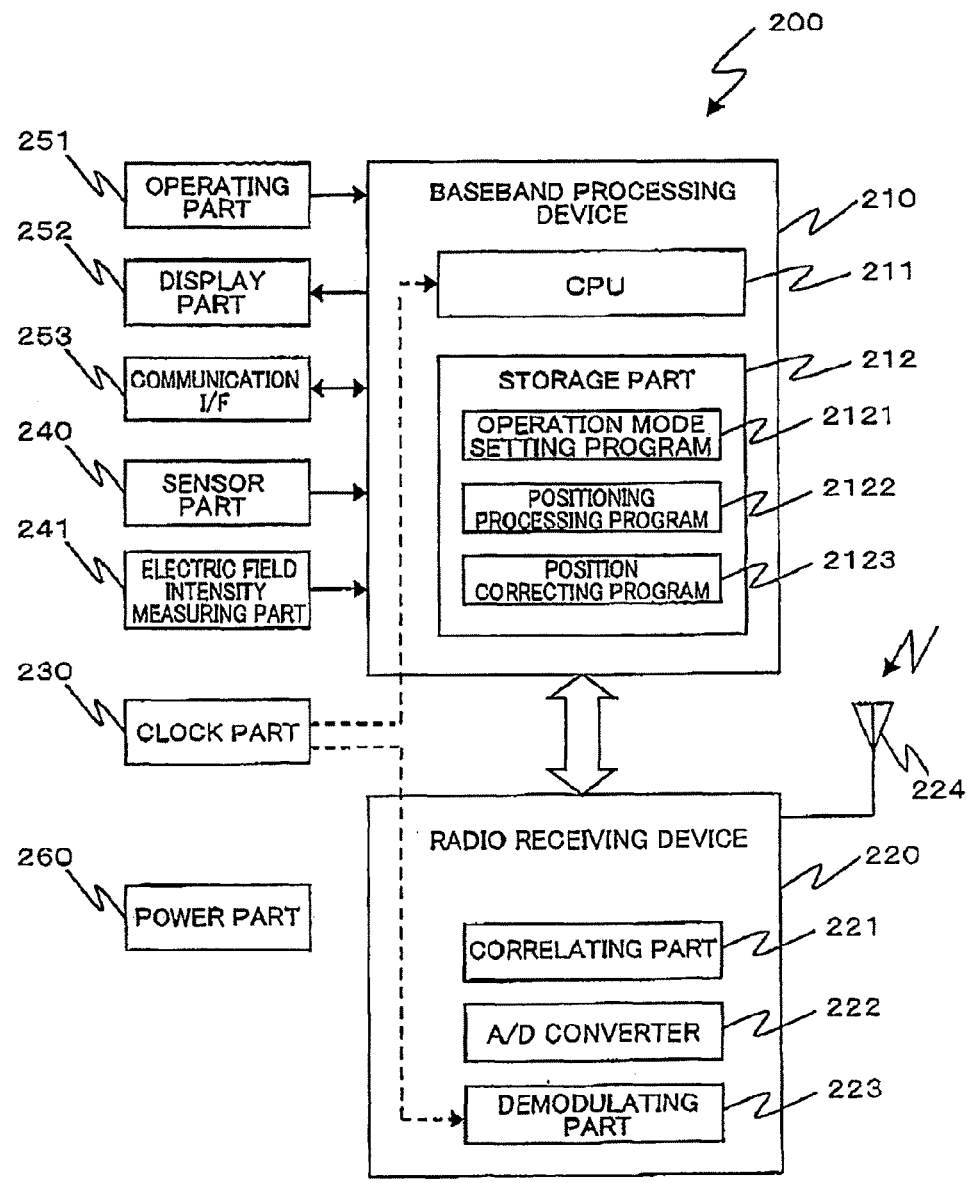
FIG. 5 is a block diagram of a communication terminal 200.

FIG. 5 is a block diagram of the communication terminal 200. As shown in FIG. 5, the communication terminal 200 includes a baseband processing part 210, a radio receiving part 220, a clock part 230, a sensor part 240, an electric field intensity measuring part 241, an operating part 251, a displaying part 252, a communication I/F 253, and a power source part 260. The communication terminal 200 is a GPS receiving apparatus or a portable telephone equipped with GPS, for example.

The baseband processing part 210 includes a CPU 211 and a storage part 212. The CPU 211 executes programs stored in the storage part 212 to implement various functions of the communication terminal 200.

The storage part 212 is, for example, RAM (Random Access Memory), ROM (Read Only Memory), and a nonvolatile memory such as flash memory. The storage part 212 stores an operation mode setting program 2121 that is a program implementing a function of setting an operation mode of the communication terminal 200 (hereinafter, an operation mode setting part), a positioning process program 2122 that is a program implementing a function about acquisition of the current position of the own device (positioning) (hereinafter, a positioning processing part), and a position correction program 2123 that is a program implementing a function about position correction with sensor information, etc., (hereinafter, a position correcting part).

The radio receiving part 220 includes a correlating part 221, an A/D converting part 222, a demodulating part 223, and an antenna 224.

The demodulating part 223 generates a signal (herein after, a reception signal) by demodulating (BPSK-demodulating) the analog signal received through the antenna 224 with a clock signal input from the clock part 230 and input the generated reception signal to the A/D converting part 222.

The A/D converting part 222 converts the reception signal input from the demodulating part 223 into a digital signal.

The correlating part 221 includes a plurality of correlators 2211 capable of concurrent operation (capable of tracking a plurality of channels corresponding to different C/A codes). The C/A codes to be demodulated may independently and respectively be set in the correlators 2211. Each of the correlators 2211 compares the C/A code included in the digital signal input from the ND converting part 222 with a replica pattern (C/A code uniquely stored or generated by the communication terminal 200) and inputs a signal demodulated from the C/A code included in the digital signal to the baseband processing part 210.

The clock part 230 generates a clock signal for operating the CPU 211 and a clock signal (e.g., 1.024 MHz) necessary for the demodulation by the demodulating part 223. The clock part 130 include an oscillator such as TCXO (temperature compensated crystal oscillator) and OCXO (oven-controlled crystal oscillator), for example.

The operating part 251 is a user interface for performing input operation to the communication terminal 200 and includes operation buttons, an operation dial, etc.

The displaying part 252 is an interface that displays various pieces of information and is a liquid crystal monitor, an organic EL panel, etc.

The communication I/F 253 is a communication interface for connecting the position information transmitter 100 to an external apparatus. The communication I/F 253 is RS-232C, UART (Universal Asynchronous Receiver Transmitter), open collector, TTL (Transistor-Transistor Logic), parallel I/F, USB (Universal Serial Bus), etc.

The sensor part 240 includes sensors acquiring information (current position environment information) indicative of the current surrounding environment such as an atmospheric pressure sensor and an illuminance sensor. The electric field intensity measuring part 241 is made up of an RSSI circuit, for example, and inputs a signal indicative of the electric field intensity of received radio signals to the baseband processing part 210.

The power source part 260 supplies drive power to the parts of the portable terminal 200.

Figure 6:
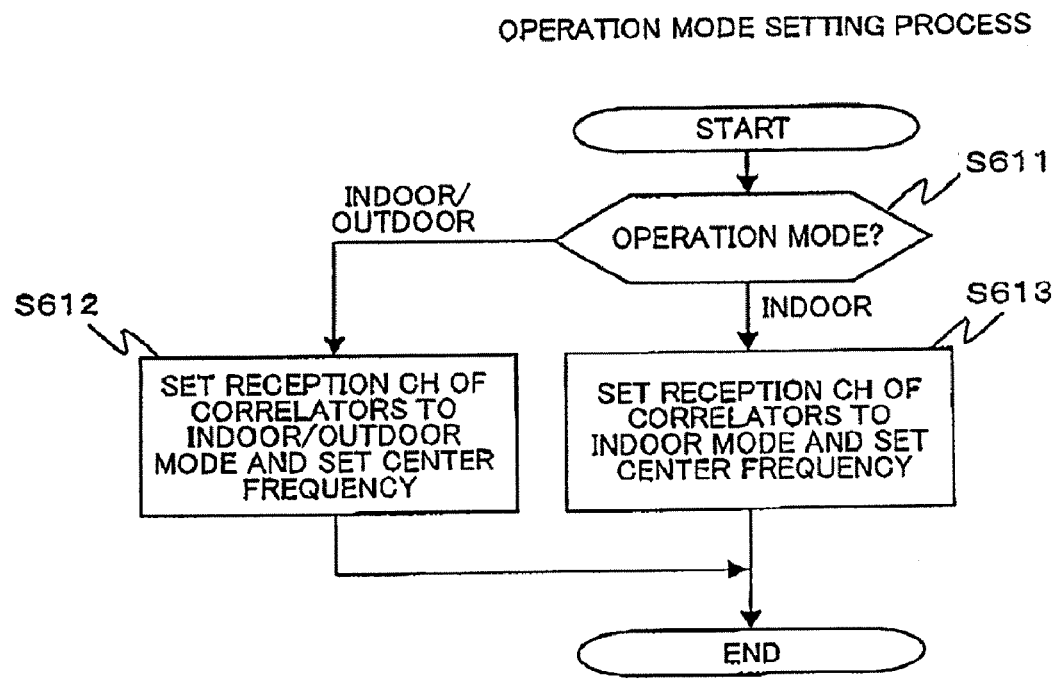
FIG. 6 is an explanatory flowchart of an operation mode setting process.

FIG. 6 is an explanatory flowchart of a process executed by the operation mode setting part (operation mode setting process). The process shown in FIG. 6 is automatically or manually started, for example, when the communication terminal 200 is turned on or when a user performs a predetermined setting operation.

First, the operation mode setting part acquires the operation mode currently set in the communication terminal 200. The storage part 212 of the baseband processing part 210 stores information indicative of the operation mode currently set in the communication terminal 200 and the operation mode setting part acquires this information (S611).

The operation mode setting part sets channels (C/A codes demodulated by the correlators) for the radio signals (satellite positioning signal or position information signal) captured by the correlators of the correlating part 221 and the center frequency depending on the acquired operation mode (S612 and S613). The center frequency is 1575.42 MHz in the case of the L1 signal, for example. The center frequency is not necessarily matched completely to this frequency and may be set to a slightly mismatched frequency.

FIG. 7 depicts an exemplary setting of the correlators when five correlators exist. As shown in FIG. 7, if the operation mode is set to "indoor/outdoor" (S611: indoor/outdoor), the operation mode setting part sets four correlators (1 to 4) to channels (8ch, 11ch, 15ch, and 20ch) for the satellite positioning signal and one other correlator (5) to a channel (180ch) for the position information signal.

If the operation mode is set to "indoor" (S611: indoor), the operation mode setting part sets only one correlator (1) to a channel (8ch) for the satellite positioning signal and four other correlators (2 to 5) to channels (174ch, 175ch, 179ch, and 180ch) for the position information signal.

In either operation mode, at least one correlator (the correlator (5) in FIG. 7) is set to a certain channel (180ch) for the position information signal. This is for the purpose of enabling the communication terminal 200 to automatically set an operation mode when receiving position relation information having a boundary flag set to "1" as described later.

Although the case of the correlating part 221 including five correlators is described as an example, the number of correlators included in the correlating part 221 is not limited to five. For example, if the correlating part 221 includes 16 correlators, 14 correlators are set to channels for the satellite positioning signal and two other correlators are set to channels for the position information signal if the operation mode is "indoor/outdoor". If the operation mode is "indoor", two correlators are set to channels for the satellite positioning signal and 14 other correlators are set to channels for the position information signal.

Figure 8:
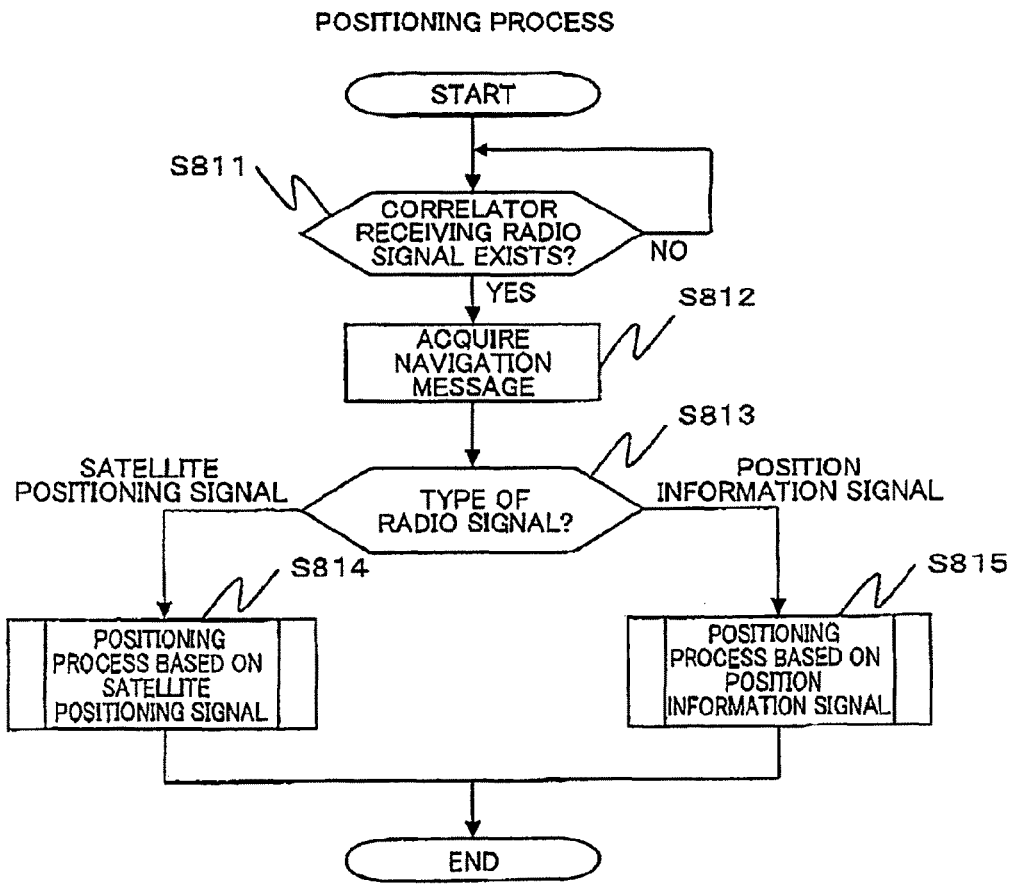
FIG. 8 is an explanatory flowchart of a positioning process.

FIG. 8 is an explanatory flowchart of a process of acquiring the current position of the own device (positioning process) executed by the positioning processing part.

The positioning processing part monitors in real time whether a correlator receiving the radio signal (satellite positioning signal or position information signal) exists based on the signal input from the radio receiving part 220 (S811) and if a correlator receiving the radio signal exists (S811: YES), the positioning processing part acquires a navigation message included in the radio signal received by the correlator (S812).

The positioning processing part checks whether the channel set in the correlator receiving the radio signal is a channel for the artificial satellites or a channel for the position information transmitters to determined whether the received radio signal is the satellite positioning signal or the position information signal (s813). In the case of the satellite positioning signal (S813: satellite positioning signal), the positioning processing part executes a positioning process based on the satellite positioning signal (S814). On the other hand, if the received radio signal is the position information signal (S813; position information signal), the positioning processing part executes a positioning process based on the position information signal (S815).

Figure 9:
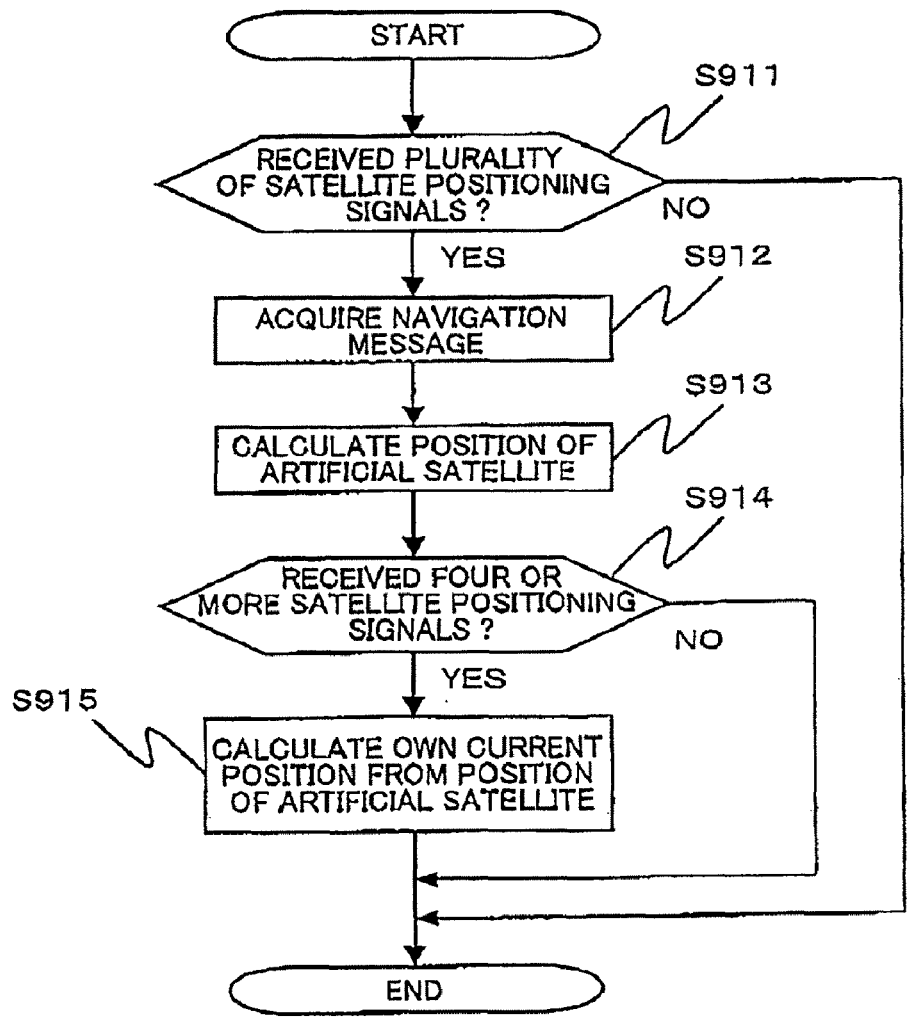
FIG. 9 is an explanatory flowchart of the positioning process based on the satellite positioning signal (S814)

FIG. 9 is an explanatory flowchart of the positioning process based on the satellite positioning signal (S814).

As shown in FIG. 9, the positioning processing part determines whether a plurality of satellite positioning signals is received (S911) and if a plurality of satellite positioning signals is received (S911: YES), the positioning processing part acquires the navigation messages from the satellite positioning signals (S912). On the other hand, if it is determined that a plurality of satellite positioning signals is not received (S911: NO), the process is terminated.

The positioning processing part finds positions of the artificial satellites based on the navigation messages of the satellite positioning signals acquired at step S912 (S913). The positioning processing part finds distances (pseudo ranges) from the communication terminal 200 to the artificial satellites based on the propagation times of electric waves from the artificial satellites to calculate the coordinates of the artificial satellites from the precise orbit information (ephemeris) included in the navigation messages.

The positioning processing part determines whether the satellite positioning signals from four or more artificial satellites are received (S914). If the satellite positioning signals from four or more artificial satellites are received (S914: YES), the positioning processing part calculates the current position (latitude, longitude, and altitude) from the positions of the artificial satellites found at S913. On the other hand, if the satellite positioning signals from four or more artificial satellites are not received (S914: NO), the process is terminated.

Figure 10:
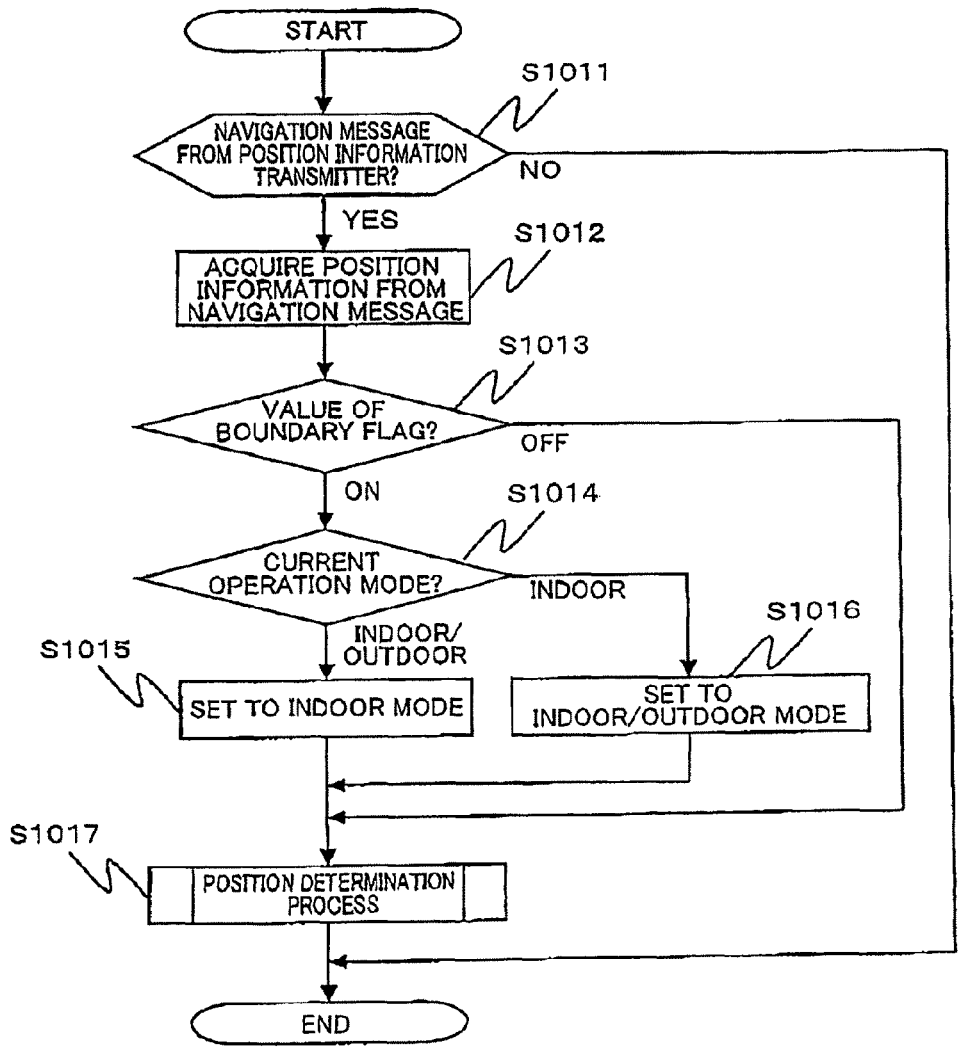
FIG. 10 is an explanatory flowchart of the positioning process based on the position information signal (S815)

FIG. 10 is an explanatory flowchart of the positioning process based on the position information signal (S815).

As shown in FIG. 10, the positioning processing part determines whether the navigation messages acquired at S812 are those transmitted from the position information transmitter 100 (S1011). If it is determined that the navigation messages are those transmitted from the position information transmitter 100 (S1011; YES), the process goes to S1012, and if it is determined that the navigation messages are not those transmitted from the position information transmitter 100 (S1011; NO), the process is terminated.

Whether the navigation messages are those transmitted from the position information transmitter 100 is determined by checking whether the navigation messages (or position information signals) include information indicative of that the navigation messages are those transmitted from the position information transmitter 100.

At S1012, the positioning processing part acquires position information (the boundary flag 311, the disposition height 312, the disposition position (the latitude 313 and the longitude 314), the sensor information 315, etc.) from the navigation messages.

The positioning processing part checks details of the boundary flag 311 of the position information (S1013). If the boundary flag is "1; on" (S1013: on), the process goes to S1014. If the boundary flag is "0: off" (S1013: off), the process goes to S1017.

At S1014, the positioning processing part checks the current operation mode set in the communication terminal 200 (S1014). If the current operation mode is set to "indoor/outdoor shared mode" (S1014; indoor/outdoor), the positioning processing part sets the operation mode of the communication terminal 200 to the "indoor mode" (S1015). On the other hand, if the current operation mode is set to "indoor mode" (S1014: indoor), the positioning processing part sets the operation mode of the communication terminal 200 to the "indoor/outdoor shared mode" (S1016).

The case of the current operation mode set to "indoor/outdoor shared mode" at S1014 occurs, for example, when a user of the communication terminal 200 outside of the building 3 comes closer to the doorway 31 of the building 3 and receives the position information signal of the position information transmitter 100(1) in FIG. 1.

The case of the current operation mode set to "indoor" at S1014 occurs, for example, when the operation mode is set to "indoor mode" at S1016 by receiving the position information signal from the position information transmitter 100(1) that transmits the position information signal with the boundary flag set to "1: on" at the time of passage through the doorway 31 because a user of the communication terminal 200 passes through the doorway 31 of the building 3 and enters into the building 3 and the user subsequently comes closer to the doorway 31 to go out of the building 3 again and receives the position information signal of the position information transmitter 100(1) in FIG. 1.

As above, the operation mode of the communication terminal 200 initially set at the time of power-on, etc., is set to a operation mode preferable for the communication terminal 200 automatically acquiring the own current position when the communication terminal 200 receives the position information signal with the boundary flag set to "1: on" from the position information transmitter 100. Therefore, for example, the setting may automatically be performed in such a way that a rate of correlators receiving the position information signals is increased if the communication terminal 200 exists indoors and a rate of correlators receiving the satellite positioning signals is increased if the communication terminal 200 exists outdoors. Performing the appropriate setting of the operation mode as above reduces a period when the communication terminal 200 is unable to identify the own current position and the communication terminal 200 may stably and reliably acquire the own current position.

Figure 11:
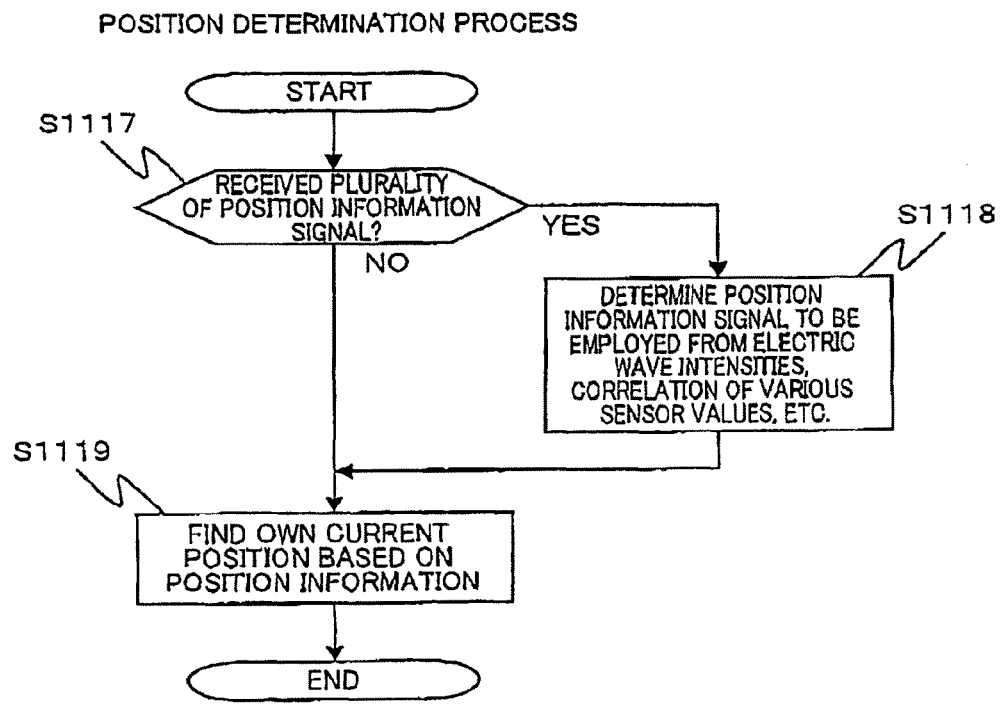
FIG. 11 is an explanatory flowchart of the position determination process (S1017)

At S1017 of FIG. 10, the positioning processing part executes the next position determination process (S1017). FIG. 11 is an explanatory flowchart of the position determination process (S1017).

In the position determination process (S1017), first, the positioning processing part determines whether a plurality of position information signals are received (S1117). The case of the communication terminal 200 receiving a plurality of position information signals occurs, for example, when the terminal is located near the center position of the disposition positions of a plurality of the position information transmitters 100 or when the position information signal from the position information transmitter 100 disposed in a room currently containing the communication terminal 200 is received along with the position information signals from the position information transmitters 100 disposed in other rooms (position information signals transmitted and arriving through a wall, a floor, and a window).

At S1117, if it is determined that the communication terminal 200 receives a plurality of position information signals (S1117: YES), the process goes to step S1118. On the other hand, if it is determined that the communication terminal 200 does not receive a plurality of position information signals (S1117: NO), the process goes to step S1119.

At S1118, the positioning processing part determines the position information signal that should be selected for finding the own current position among the plurality of the received position information signals.

For example, the positioning processing part compares respective electric field intensities of the position information signals acquired from the electric field intensity measuring part 241 to select the position information signal having the highest electric field intensity.

For example, the positioning processing part compares values of atmospheric pressure, illuminance, etc., acquired from the sensor part 240 with values of the sensor information in the position information included in the position information signals to select the position information signal having the highest similarity between the values.

For example, the positioning processing part selects the position information signal having the smallest difference between the atmospheric pressure of the sensor information 315 in the position information and the atmospheric pressure acquired from the own sensor part 240.

For example, the positioning processing part selects the position information signal having the smallest difference between the illuminance of the sensor information 315 in the position information and the illuminance acquired from the own sensor part 240.

For example, the positioning processing part determines which position information signal is selected based on a comprehensive correlation value obtained by performing predetermined weighting of atmospheric pressure, illuminance, etc.

Since the positioning processing part determines the position information signal to be selected based on the result of comparing the respective values measured by the communication terminal 200 and the position information transmitter 100, i.e., based on the relative relationship between both values, the position information signal to be selected may be appropriately determined without being affected by environmental changes such as changes in the atmospheric pressure and changes in the illuminance due to changes in sunshine.

At S1119, the positioning processing part finds the own current position based on the received position information signal (the position information signal determined at S1118 if a plurality of position information signals are received). For example, the positioning processing part defines the own current position as the disposition height 312 and the disposition position (the latitude 313 and the longitude 314) of the position information.

For example, the positioning processing part defines the own current position as values of the disposition height 312 and the disposition position (the latitude 313 and the longitude 314) of the position information corrected by the sensor information 315 of the position information and values acquired from the sensor part 240.

Specifically, for example, if a difference exists between both atmospheric pressures, the disposition height 312 acquired from the position information is corrected based on a relational expression of the atmospheric pressure and the altitude (or a table representative of the relationship between the atmospheric pressure and the altitude). For example, if a difference exists between both illuminance values, the disposition position (the latitude 313 and the longitude 314) acquired from the position information is corrected based on a table (or relational expression) representative of the relationship between the illuminance and the position (the latitude 313 and the longitude 314).

As above, the positioning processing part may compare the sensor information 315 acquired from the received position information with values acquired from the own sensor part 240 to automatically correct the disposition height 312 and the disposition position (the latitude 313 and the longitude 314) acquired from the position information, automatically acquiring the corrected value as the own current position. Therefore, the communication terminal 200 may acquire accurate values as the own current position.

If the disposition height of the position information transmitter 100 and the height of the communication terminal 200 (height of the communication terminal 200 carried by a user) are preliminarily known in such a case that the communication terminal 200 is a portable telephone, the positioning processing part adds or subtracts the difference to or from the disposition height 312 and the disposition position (the latitude 313 and the longitude 314) acquired from the position information to correct the disposition height 312 of the position information.

Figure 13:
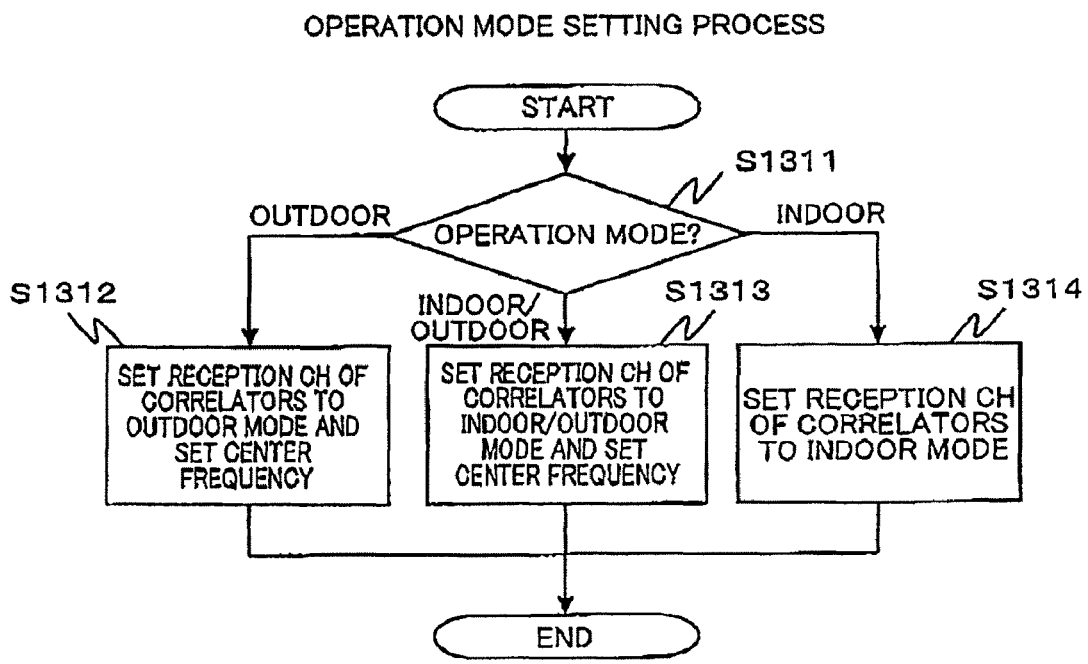
FIG. 13 is an explanatory flowchart of the operation mode setting process.

Although the case of two operation modes (indoor/outdoor and indoor) is described in FIG. 6, the number of the operation modes is not necessarily limited to two. For example, as shown in FIG. 12, three operation modes (outdoor, indoor/outdoor, and indoor) are available. FIG. 13 depicts a variation of the operation mode setting process of FIG. 6 and is an explanatory flowchart of the operation mode setting process in the case of three operation modes.

At S1311 of FIG. 13, the operation mode setting part acquires the operation mode currently set in the communication terminal 200. The operation mode setting part sets channels for the radio signals (satellite positioning signal or position information signal) captured by the correlators of the correlating part 221 and the center frequency depending on the acquired operation mode (S1312, S1313, and S1314).

As shown in FIG. 12, if the operation mode is set to "outdoor" (S1211: outdoor), the operation mode setting part sets four correlators (1 to 4) to channels (8ch, 11ch, 15ch, and 20ch) for the satellite positioning signal and one other correlator (5) to a channel (180ch) for the position information signal.

If the operation mode is set to "indoor/outdoor" (S1211: indoor/outdoor), the operation mode setting part sets two correlators (1 to 2) to channels (8ch and 11ch) for the satellite positioning signal and three other correlators (3 to 5) to channels (175ch, 179ch, and 180ch) for the position information signal.

If the operation mode is set to "indoor" (S1211: indoor), the operation mode setting part sets only one correlator (1) to a channel (8ch) for the satellite positioning signal and four other correlators (2 to 5) to channels (174ch, 175ch, 179ch, and 180ch) for the position information signal.

As in the case of FIG. 6, in any operation mode, at least one correlator (the correlator (5) in FIG. 12) is set to receive a certain channel (180ch) added to the position information transmitters 100.

Even if three operation modes exist, the number of correlators is not limited to five, as in the case of FIG. 6. For example, if the correlating part 221 includes 16 correlators, 14 correlators are set to channels for the satellite positioning signal and two other correlators are set to channels for the position information signal if the operation mode is "outdoor". If the operation mode is "indoor/outdoor", seven correlators are set to channels for the satellite positioning signal and nine other correlators are set to channels for the position information signal. If the operation mode is "indoor", two correlators are set to channels for the satellite positioning signal and 14 other correlators are set to channels for the position information signal.

If the communication terminal 200 with the operation mode set to "outdoor" receives the position information signal from the position information transmitter 100 with the boundary flag 311 set to "1" (e.g., the position information transmitter 100(1) of FIG. 1), the communication terminal 200 may automatically switch the own operation mode to "indoor/outdoor" or "indoor".

If the communication terminal 200 with the operation mode set to "indoor" or "indoor/outdoor" receives the position information signal from the position information transmitter 100(1) with the boundary flag set to "1", the communication terminal 200 may automatically switch the own operation mode from "indoor" or "indoor/outdoor" to "outdoor".

If the communication terminal 200 with the operation mode set to "indoor/outdoor" receives the position information signal from the position information transmitters (2 to 5) other than the position information transmitter 100(1) with the boundary flag set to "1", the communication terminal 200 may automatically switch the own operation mode from "indoor/outdoor" to "indoor".

If the communication terminal 200 with the operation mode set to "indoor" or "indoor/outdoor" becomes unable to receive the position information signal from the position information transmitters (2 to 5) other than the position information transmitter 100(1) with the boundary flag set to "1" for a predetermined time period or more, the communication terminal 200 may automatically switch the own operation mode from "indoor" or "indoor/outdoor" to "outdoor".

If the communication terminal 200 with the operation mode set to "indoor/outdoor" or "indoor" receives the satellite positioning signal from the artificial satellites 2, the communication terminal 200 may automatically switch the own operation mode from "indoor" or "indoor/outdoor" to "outdoor" (the setting giving priority to the satellite positioning signal).

The above description of the embodiment is for the purpose of facilitating the understanding of the present invention and does not limit the present invention. The present invention may be altered or modified without departing from the spirit thereof and, of course, the present invention includes equivalents thereof.

For example, although the communication terminal 200 allocates different channels to the own respective correlators in the above description, a plurality of the own respective correlators may be set to receive the position information signal of the same channel, and the correlators set to receive the position information signal of the same channel may search different frequency ranges in a frequency range to be searched in the set channel.

Specifically, for example, if a frequency range to be searched in the set channel is frequencies f1 to f3, a first correlator is set to search the frequencies f1 to f2 (f1<f2<f3) and a second correlator is set to search the frequencies f2 to f3.

Since this causes the searching of the channel to be shared and performed simultaneously in parallel by a plurality of correlators and a frequency range to be searched by each correlator becomes narrow, the search time is reduced. As a result, the time required for the communication terminal 200 to acquire the own current position is reduced. The frequency range searched by the first correlator and the frequency range searched by the second correlator are preferably set such that overlapping ranges are reduced as much as possible.

For example, the position information signal including the position information including the setting of channels set for the surrounding device channels 317 may be transmitted and the communication terminal 200 may automatically set the own correlators so as to receive the channels set for the surrounding device channels 317 in the position information. This reduces the time required for searching the position information signal transmitted from the position information transmitter 100 located on the destination, for example, when the communication terminal 200 is moved and, as a result, the time required for the communication terminal 200 to acquire the own current position is reduced.

Although the sensors are exemplarily illustrated as an atmospheric pressure sensor and an illuminance sensor in the above description, the sensors are not limited to these types. For example, the sensors may be a temperature sensor and a humidity sensor. The type of the radio signals transmitted from the artificial satellites 2 and the position information transmitters 100 are not limited to electric waves. For example, the radio signals may be those utilizing light, infrared light, etc.

What is claimed is:

1. A position information transmitter comprising:
   a digital processing device including a CPU and a position information database storing position information of the position information transmitter and information of channels used by other position information transmitters; and
   a radio transmitting device executing a signal modulation, wherein the digital processing device generates spread spectrum signals from the position information of the position information transmitter and information of channels used by other position information transmitters, by using the C/A code, and the radio transmitting device modulates the spread spectrum signals and transmits modulated signals as a radio signals.

2. A position information transmitter according to claim 1, wherein the digital processing device generates the spread spectrum signals further from a sensor information obtained at a sensor attached to the position information transmitter.

3. A position information transmitter according to claim 2, wherein the sensor information is at least one of the atmosphere pressure information or an illuminance value.

4. A position Information transmitter according to claim 1, wherein the digital processing device generates the spread spectrum signals further from a boundary flag whose value is based on a setting location of the position information transmitter.

5. A position information transmitter according to claim 1, wherein the digital processing device generates the spread spectrum signals further from a boundary flag based on which a communication terminal changes a correlator to receive radio signals from a plurality of correlators each of which is used to receive one of the position information from the position information transmitter or satellite positioning signal from a satellite system.

6. A position information transmitter according to claim 1, wherein the position information transmitted from the position information transmitter is compatible with satellite positioning signals transmitted from a satellite system.

7. A position Information transmitter according to claim 6, wherein the satellite positioning signals are one of the L1 signals with 1575.42 MHz or L2 signals with 1227.6 MHz, and modulated by using BPSK (Bi Phase Shift keying).

8. A positioning system comprising:

a position information transmitter transmitting a position information; and a communication terminal receiving the position information from the position information transmitter and satellite positioning information from a satellite system, wherein the communication terminal has a plurality of correlators each receiving one of the position information or the satellite positioning information based on an operation mode of each correlator, wherein at least one of the plurality of correlators is set to receive the satellite positioning information, wherein the communication terminal receives operation mode information from the position information transmitter, and selects which of the satellite positioning information or the position information each of the plurality of the correlators receives based on the operation mode information.

* * * * *